United States Patent [19] [11] 4,041,233
Fletcher et al. [45] Aug. 9, 1977

| [54] | ALDEHYDE-CONTAINING UREA-ABSORBING POLYSACCHARIDES |
|---|---|
| [76] | Inventors: James C. Fletcher, Administrator of the National Aeronautics and Space Administration, with respect to an invention of; William A. Mueller, Glendale, Calif.; George C. Hsu, La Crescenta, Calif.; Harold E. Marsh, Jr., La Canada, Calif. |
| [21] | Appl. No.: 666,992 |
| [22] | Filed: Mar. 15, 1976 |
| [51] | Int. Cl.² .............. C08B 3/22; C08B 11/20; C08B 15/02; C08B 31/18 |
| [52] | U.S. Cl. ................ 536/56; 210/24; 536/58; 536/84; 536/85; 536/105 |
| [58] | Field of Search ............ 536/56, 58, 84, 85, 536/105 |

[56] References Cited

U.S. PATENT DOCUMENTS

| 2,606,188 | 8/1952 | Yelland ........................ 536/105 |
| 2,648,629 | 8/1953 | Dvonch et al. ................ 536/105 |
| 3,033,851 | 5/1962 | Schaefer et al. .............. 536/105 |
| 3,086,969 | 4/1963 | Slager .......................... 536/105 |
| 3,313,641 | 4/1967 | Borchert ...................... 536/105 |
| 3,634,395 | 1/1972 | Walon .......................... 536/105 |

FOREIGN PATENT DOCUMENTS

| 253,034 | 7/1964 | Australia ...................... 536/105 |
| 703,933 | 2/1965 | Canada ........................ 536/105 |
| 7150/62 | 7/1962 | Japan ........................... 536/105 |

*Primary Examiner*—Ronald W. Griffin
*Attorney, Agent, or Firm*—Monte F. Mott; Wilfred Grifka; John R. Manning

[57] ABSTRACT

A novel aldehyde-containing polymer (ACP) is prepared by reaction of a polysaccharide with periodate to introduce aldehyde groups onto the $C_2 - C_3$ carbon atoms and by introduction of ether and ester groups onto the pendant primary hydroxyl to modify solubility characteristics. The ACP is utilized to absorb nitrogen bases such as urea in vitro or in vivo.

7 Claims, No Drawings

ALDEHYDE-CONTAINING UREA-ABSORBING POLYSACCHARIDES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to a mofified polysaccharide, to methods of synthesis and to methods of use in absorbing basic compunds such as urea from solution.

2. Description of the Prior Art

A sizable fraction estimated 50,000 people who die of kidney failure each year in the United States are free of other complications and might be restored to useful life if their kidney function could be artifically. At present, artificial kidneys (using hemodialysis) and clinical procedures have been developed to the point where long-term sustenance of life by periodic hemodialysis is practicable in many cases.

The limitations in using hemodialysis are the small number of patients who can be treated with a given kidney machine and the considerable expense of maintaining and staffing a kidney-treatment center. Obviously, a desirable solution lies in the development of an artificial kidney which is inexpensive, portable and capable of being operated outside the confines of a hospital with a minimum of medical attention. Attainment of this solution will require increased efficiency of mass transfer and further optimization of design of artificial-kidney systems.

In recent years, considerable attention has been focused on methods of reducing the size of the artificial kidney. This requires miniaturization of the membrane-containing dialyzer and a significant reduction in the volume of dialyzing fluid. It is generally conceded that the toxin primarily responsible for the uremic syndrome has not yet been identified. Even though urea is not considered particularly toxic, its removal is one of the chief objectives on urea reomval is that, in the absence of more specific knowledge, dialysis based on this principle is obviously beneficial. At least two explanations suggest themselves: (a) Unidentified toxicants are removed along with the urea. (b) Urea produces toxic products.

In order to increase the efficiency of hemodialysis, it is desirable to maintain the trans-membrane concentration gradient of waste metabolites as high as possible. Low waste concentrations in the dialyzing fluid have in the past been maintained by two methods. The more widely used method is the continual dilution of the dialyzed substances in a large reservoir fluid, usually 100 to 300 liters. A second method of maintaining the gradient is to use the dialyzing fluid in a single-pass operation, where the waste-bearing effluent is discarded. Even then, more than 100 liters of fluid are required. The current research trend in obtaining low concentrations of wastes is to remove them selectively from the dialyzing fluid. Such an approach would allow the use of much smaller volumes of dialyzing fluid. Among all waste products, urea is by far the major waste metabolite which must be removed daily from the body fluid. Three major methods of urea removal from dialysate have been reported.

The first procedure utilizes an activated carbon bed which removes urea by absorption. However, the demonstrated capacity for urea is only 0.2–0.8 grams per 100 grams of carbon. In another method urea is reduced by enzymatic hydrolysis either inside microcapsules or by the combination with other absorbents. A commercial apparatus utilizes sodium zirconium phosphate to remove the ammonia produced by enzymatic decomposition of urea in the presence of urease. However, the capacity of urea removal is limited by the reaction extent of enzymatic decomposition.

It has recently been reported that oxystarch has been used for binding urea in its transit through the gastrointestinal tract (an in vivo application). Oxystarch is receiving wide attention for its potential as an absorber in the gastointestinal tract. The disappointing aspect about this material is that it is useless in diaylsate because it dissolves in that fluid. Oxystarch absorbs urea at low pH but will dissolve if treated with alkali at pH 8. Therefore, oxystarch will dissolve into dialysate or leach into the blood if utilized for in vivo applications.

SUMMARY OF THE INVENTION

An improved nitrogen base absorbent is provided in accordance with this invention. The absorbent demonstrates a significant affinity for urea molecules while being insoluble in dialysate utilized in an artificial kidney system. The absorbent will find use generally in absorption of basic materials and particularly, ammonia, ammonium amine or amide compounds such as urea from solution. In vivo use by digestion of the material, and absorption of urea or other amide substituted metabolites while passing through the G.I. tract is also indicated.

The absorbents of the invention have demonstrated absorption of at least 1% urea based on weight of absorbent under physiological conditions (0.03M urea, pH 7). Some of the absorbents of the invention exhibit absorption capacities comparing favorable with that of the commercially utilized urease-zirconium phosphate system which has a urea absorption of about 2%.

The absorbents of this invention are prepared by modification of the primary hydroxyl group of the amylose unit of a polysaccharide to introduce from 0.05 to about 0.5 degree of subsititution of an ether or organic ester moiety and by specific vic-glycol oxidation of the $C_2 - C_3$ hydroxyl groups with a reagent such as periodate to introduce from 10 to 35% by weight of aldehyde groups.

The aldehyde groups are responsible for the absorption capacity of the modified polysaccharide and the primary hydroxyl substitution provides the desired insolubility characteristics while permitting the absorbent to be swellable such that the introduced aldehyde groups are available for absorption.

DESCRIPTION OF THE PREFERRED EMBODIMENTS

Polysaccharide materials for use in this invention have a molecular weight from 30,000 to 14,000,00 and may be derived from homopolysaccharide or heteropolysaccharide sources, and are preferably homopolysaccharides such as starch or cellulose. The fraction of interest is the amylose containing material of the formula:

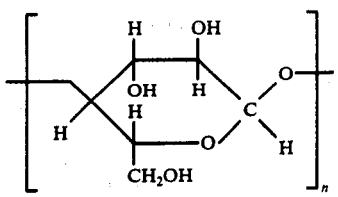

The periodate reaction is specific for the oxidation of the $C_2 - C_3$ hydroxyl groups to form a dialdehyde as follows:

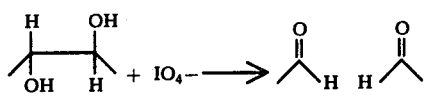

The oxidation is practiced at a pH of 4-5 and ambient temperature with from 0.5 to 1.5 moles of alkali metal periodate per mole of polysaccharide, typically equimolar sodium periodate. The oxidation may be practical before or after susbtitution of the primary hydroxyl. However, since the dialdehyde groups are subject to hemi-acetal shift during etherification or esterification it may be preferable to practice the subsititution step before oxidation.

The substitution step is practiced according to art-recognized etherification or esterification procedures except that the degree of substitution is controlled to introduce a small amount of substituent and to favor the susbstitution at the primary hydroxyl position. The primary hydroxyl groups are substituted to form an absorbent in which 0.05 to 0.5 of amylose units are of the formula:

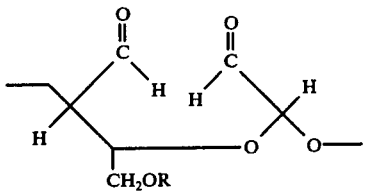

where R is aliphatic or aromatic ether or ester, preferably alkyl of 1 to 6 carbon atoms, phenyl or alkylated phenyl, substituted alkyl such as carboxyalkyl of alkanoyl of 1-6 carbon atoms such as

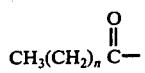

where n is 0 to 4.

Etherification is effected by treatment with alkali such as 5-30% NaOH followed by an alkylation reagent such as an alkyl or aryl halide at room or elevated temperature. Esterification can be practiced by soaking the cellulose in a dilute solution of sulfuric acid in glacial acetic acid which is then added to a mixture of acetic anhydride and acetic acid or by suspension in pryidine with excess of acetic, propionic or butyric anhydride.

Specific examples of practice follow:

The absorbents were tested for urea absorption in isotonic dialysate as follows:

Two gram samples of the various products were stirred with 100 ml of the following solution:

1 liter distilled water
4.5 grams sodium acetate trihydrate
5.8 grams sodium chloride
2.0 grams urea Urea concentration of the solution was measured by a spectrophotometric method involving formation of a colored reaction product of urea and p-dimethylaminobenzaldehyde as described in Handbook of Analytical Chemistry, L. Meites ed., McGraw-Hill, 1963, P. 46-48. The samples were suspended in the urea test solution and stirred with a magnetic stirring bar. After the desired time had elasped, the mixture was filtered to remove suspended material and the urea concentration in the filtrate determined.

Absorbents were prepared by etherification or esterification of cellulose, followed by oxidation of the etherified sample with aqueous sodium periodate at pH 4-5 and ambient termperature.

EXAMPLE 1

Carboxymethyl cellulose (D.S. 0.15) was stirred with an equimolar quantity of 6% sodium periodate solution in water at room temperature until reaction was complete as evidenced by lack of color formation with maganous ion-phosphoric acid mixture. Time required was 36 hours. The resulting solid was washed until free of iodate. It was then tested for urea absorption and showed a urea pickup of 2% by weight after 16 hours.

EXAMPLE 2

Cellulose filter pulp (4 g) was suspended in 20% sodium hydroxide for a few minutes. It was then filtered and washed with water until neutral. The water was exchanged with dioxane, the dioxane-wet pulp was washed with pyridine and suspended in fresh pyridine. A 20% molar excess of p-toluene sulfonychloride was added, and the mixture stirred for 4 hours at room temperature, and allowed to stand overnight. The solid was filtered and washed, suspended in methanol, and a 2 molar excess of sodium methoxide was added. The mixture was refluxed for 1 hour, and then filtered and washed with dilute acid and finally with water. It was then reacted with sodium periodate as in Example 1, filtered, washed, and dried. The material showed a urea absorption of 1.5 wt%.

Example 3

Cellulose filter pulp 4 (g) was suspended in pyridine and an excess of acetic anhydride added. The mixture was allowed to stand 3 days at room temperature, filtered, and washed. The solid was then reacted with sodium periodate and thoroughly washed. The resultant material had a urea absorption of 1.5%.

It is to be realized that only preferred embodiments of the invention have been described and that numerous substitutions, alterations and modifications may be made without departing from the spirit and scope of the invention as defined in the following claims:

What is claimed is:

1. A modified polysaccharide containing 10% to 35% by weight of $C_2-C_3$ aldehyde groups and in which 0.05 to 0.5 of the amylose units are of the formula:

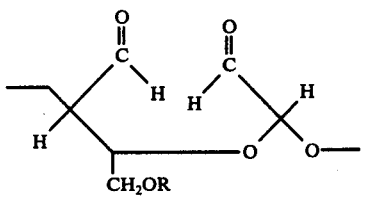

where R is the residue of an ether or ester moiety.

2. A polysaccharide according to claim 1 in which R is an alkyl of 1 to 6 carbon atoms, phenyl, alkylated phenyl, carboxyalkyl of 1 to 6 carbon atoms or the ester residue of an alkanonic acid of 1 to 6 carbon atoms.

3. A polysaccharide according to claim 2 in which R is carboxymethyl.

4. A polysaccharide according to claim 2 in which R is methyl.

5. A polysaccharide according to claim 1 having a molecular weight from 30,000 to 14,000,000.

6. A polysaccharide according to claim 5 selected from starch or cellulose.

7. A method of producing a modified polysaccharide comprising the steps in sequence:
modifying 0.05 to 0.5 of the primary hydroxyl groups of the amylose units to introduce an ether or ester group thereon; and
oxidizing the $C_2$ - $C_3$ hydroxyl groups of the amylose units to dialdehyde groups at pH 4-5 with 0.5 to 1.5 moles of an alkali metal periodate per mole of polysaccharide to introduce from 10% to 35% be weight of $C_2$ - $C_3$ aldehyde groups to form amylose units of the formula:

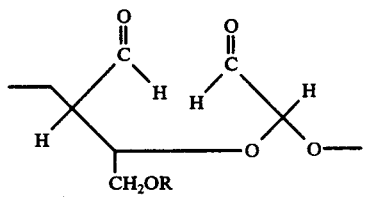

where R is the residue of an ether or ester moiety.

* * * * *